US011863944B2

(12) United States Patent
Reilly et al.

(10) Patent No.: US 11,863,944 B2
(45) Date of Patent: *Jan. 2, 2024

(54) INTELLIGENT AMPLIFIER ACTIVATION

(71) Applicant: Sonos, Inc., Santa Barbara, CA (US)

(72) Inventors: Jonathon Reilly, Cambridge, MA (US); Jonathan Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,353

(22) Filed: May 27, 2022

(65) Prior Publication Data
US 2022/0360924 A1 Nov. 10, 2022

Related U.S. Application Data

(63) Continuation of application No. 16/939,318, filed on Jul. 27, 2020, now Pat. No. 11,363,397, which is a (Continued)

(51) Int. Cl.
*G06F 3/16* (2006.01)
*H04R 29/00* (2006.01)
(Continued)

(52) U.S. Cl.
CPC ......... *H04R 29/007* (2013.01); *G01D 5/2405* (2013.01); *G06F 3/165* (2013.01);
(Continued)

(58) Field of Classification Search
CPC .. H04R 29/007; H04R 3/12; H04R 2227/003; H04R 2227/005; H04R 2420/03; G06F 3/165
(Continued)

(56) References Cited

U.S. PATENT DOCUMENTS 5,255,094 A 10/1993 Yong et al.
5,440,644 A 8/1995 Farinelli et al.
(Continued)

FOREIGN PATENT DOCUMENTS

CN 101558367 A 10/2009
EP 1199626 A2 4/2002
(Continued)

OTHER PUBLICATIONS

Advisory Action dated Apr. 2, 2019, issued in connection with U.S. Appl. No. 15/882,631, filed Jan. 29, 2018, 3 pages.
(Continued)

*Primary Examiner* — Disler Paul
(74) *Attorney, Agent, or Firm* — Fortem IP LLP; Benjamin M. Urban

(57) ABSTRACT

Embodiments are provided for intelligently activating an amplifier in a playback device based on proximity detection. The playback device may be in a quasi-idle state when the playback device is not rendering media content. The quasi-idle state of the playback device may involve an amplifier in the playback device being inactive, while some other components or modules of the playback devices remain active. The playback device may include a proximity sensor configured to detect movement relative to the playback device. If movement is detected indicating that a user input to cause the playback device to render media content is anticipated, the amplifier may be pre-emptively activated such that the playback device enters an active state from the quasi-idle state. In some cases, the playback device may send a message to one or more other playback devices to cause the other playback devices to enter an active state.

20 Claims, 11 Drawing Sheets

Related U.S. Application Data continuation of application No. 15/882,631, filed on Jan. 29, 2018, now Pat. No. 10,728,681, which is a continuation of application No. 15/338,931, filed on Oct. 31, 2016, now Pat. No. 9,883,306, which is a continuation of application No. 14/973,006, filed on Dec. 17, 2015, now Pat. No. 9,516,441, which is a continuation of application No. 13/925,367, filed on Jun. 24, 2013, now Pat. No. 9,285,886.

(51) Int. Cl.

| | | |
|---|---|---|
| *H04R 3/12* | (2006.01) | |
| *H04R 27/00* | (2006.01) | |
| *G01D 5/24* | (2006.01) | |

(52) U.S. Cl.
CPC .............. *H04R 3/12* (2013.01); *H04R 27/00* (2013.01); *H04R 2227/003* (2013.01); *H04R 2227/005* (2013.01); *H04R 2420/03* (2013.01)

(58) Field of Classification Search
USPC ................ 381/58–59, 77–83, 74, 85, 107
See application file for complete search history.

(56) References Cited

U.S. PATENT DOCUMENTS

| | | |
|---|---|---|
| 5,761,320 A | 6/1998 | Farinelli et al. |
| 5,822,598 A | 10/1998 | Lam |
| 5,857,115 A | 1/1999 | Tanaka |
| 5,923,902 A | 7/1999 | Inagaki |
| 6,032,202 A | 2/2000 | Lea et al. |
| 6,122,749 A | 9/2000 | Gulick |
| 6,148,345 A | 11/2000 | Yamaki |
| 6,157,726 A | 12/2000 | Carroll et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,590,982 B1 | 7/2003 | Chen |
| 6,611,537 B1 | 8/2003 | Edens et al. |
| 6,631,410 B1 | 10/2003 | Kowalski et al. |
| 6,643,744 B1 | 11/2003 | Cheng |
| 6,690,431 B1 | 2/2004 | Yang et al. |
| 6,757,517 B2 | 6/2004 | Chang |
| 6,778,869 B2 | 8/2004 | Champion |
| 6,970,940 B1 | 11/2005 | Vogel et al. |
| 7,126,945 B2 | 10/2006 | Beach |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,558,822 B2 | 7/2009 | Fredricksen et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,672,463 B2 | 3/2010 | Park et al. |
| 7,728,316 B2 | 6/2010 | Fadell et al. |
| 7,853,341 B2 | 12/2010 | McCarty et al. |
| 7,949,707 B2 | 5/2011 | McDowall et al. |
| 7,957,762 B2 | 6/2011 | Herz et al. |
| 7,987,294 B2 | 7/2011 | Bryce et al. |
| 8,014,423 B2 | 9/2011 | Thaler et al. |
| 8,024,055 B1 | 9/2011 | Holmgren et al. |
| 8,030,914 B2 | 10/2011 | Alameh et al. |
| 8,045,952 B2 | 10/2011 | Qureshey et al. |
| 8,103,009 B2 | 1/2012 | McCarty et al. |
| 8,189,816 B2 | 5/2012 | Solow |
| 8,213,625 B2 * | 7/2012 | Yamkovoy ........... H04R 29/004 381/60 |
| 8,234,395 B2 | 7/2012 | Millington |
| 8,244,313 B2 | 8/2012 | Huang et al. |
| 8,332,414 B2 | 12/2012 | Nguyen et al. |
| 8,381,135 B2 | 2/2013 | Hotelling et al. |
| 8,452,020 B2 | 5/2013 | Gregg et al. |
| 8,483,853 B1 | 7/2013 | Lambourne |
| 8,670,574 B2 | 3/2014 | Ito et al. |
| 9,210,523 B2 * | 12/2015 | Jacobs ................ H04R 27/00 |
| 9,225,307 B2 | 12/2015 | Reilly et al. |
| 9,280,141 B2 * | 3/2016 | Parker .................... G04C 21/02 |
| 10,798,510 B2 | 10/2020 | Lyren |
| 10,812,891 B2 | 10/2020 | Koike et al. |
| 2001/0042107 A1 | 11/2001 | Palm |
| 2001/0043592 A1 | 11/2001 | Jimenez et al. |
| 2002/0022453 A1 | 2/2002 | Balog et al. |
| 2002/0026442 A1 | 2/2002 | Lipscomb et al. |
| 2002/0072816 A1 | 6/2002 | Shdema et al. |
| 2002/0101651 A1 | 8/2002 | Dugan et al. |
| 2002/0124097 A1 | 9/2002 | Isely et al. |
| 2003/0157951 A1 | 8/2003 | Hasty, Jr. |
| 2003/0173829 A1 | 9/2003 | Zeng |
| 2003/0210796 A1 | 11/2003 | McCarty et al. |
| 2004/0024478 A1 | 2/2004 | Hans et al. |
| 2005/0117554 A1 | 6/2005 | Bleckert et al. |
| 2005/0138138 A1 | 6/2005 | Jelinek et al. |
| 2005/0177256 A1 | 8/2005 | Shintani et al. |
| 2006/0132432 A1 | 6/2006 | Bell |
| 2006/0158168 A1 | 7/2006 | Yoshida et al. |
| 2006/0161870 A1 | 7/2006 | Hotelling et al. |
| 2007/0142944 A1 | 6/2007 | Goldberg et al. |
| 2008/0005695 A1 | 1/2008 | Ozzie et al. |
| 2008/0069380 A1 * | 3/2008 | Cheng .................. H03G 3/3005 381/107 |
| 2008/0109956 A1 | 5/2008 | Bayley et al. |
| 2008/0134102 A1 | 6/2008 | Movold et al. |
| 2009/0097689 A1 | 4/2009 | Prest et al. |
| 2009/0102669 A1 * | 4/2009 | Lin ........................ G04G 21/08 340/575 |
| 2009/0110206 A1 | 4/2009 | Haggis et al. |
| 2009/0139778 A1 | 6/2009 | Butler et al. |
| 2010/0046766 A1 | 2/2010 | Gregg et al. |
| 2010/0134507 A1 | 6/2010 | Paquette et al. |
| 2010/0171027 A1 | 7/2010 | Yun |
| 2010/0171587 A1 | 7/2010 | Yoon et al. |
| 2011/0087842 A1 | 4/2011 | Lu et al. |
| 2011/0109577 A1 | 5/2011 | Lee et al. |
| 2011/0208336 A1 | 8/2011 | Cooper et al. |
| 2011/0292299 A1 | 12/2011 | Lau et al. |
| 2012/0023226 A1 | 1/2012 | Petersen et al. |
| 2012/0044199 A1 | 2/2012 | Karpin et al. |
| 2012/0237059 A1 | 9/2012 | Saito |
| 2012/0268145 A1 | 10/2012 | Chandra et al. |
| 2012/0275617 A1 * | 11/2012 | Serve .................. A47G 33/0818 381/77 |
| 2012/0287035 A1 | 11/2012 | Valko et al. |
| 2012/0318364 A1 | 12/2012 | Sawaski et al. |
| 2013/0039510 A1 * | 2/2013 | Pelland .............. H03K 17/9622 381/74 |
| 2013/0054945 A1 | 2/2013 | Free et al. |
| 2013/0064388 A1 | 3/2013 | Jacobs |
| 2013/0064389 A1 | 3/2013 | Jacobs |
| 2013/0094668 A1 | 4/2013 | Poulsen et al. |
| 2013/0343569 A1 | 12/2013 | Mayman et al. |
| 2014/0133669 A1 * | 5/2014 | Klinghult ............ H04R 1/1041 381/74 |
| 2014/0146976 A1 | 5/2014 | Rundle |
| 2014/0146980 A1 | 5/2014 | Jacobs |
| 2014/0321682 A1 | 10/2014 | Kofod-Hansen et al. |
| 2015/0078574 A1 | 3/2015 | Shin |
| 2016/0330562 A1 * | 11/2016 | Crockett .................. H04S 7/307 |

FOREIGN PATENT DOCUMENTS

| | | |
|---|---|---|
| EP | 1389853 A1 | 2/2004 |
| EP | 2194471 A1 | 6/2010 |
| EP | 2595401 A1 | 5/2013 |
| WO | 200153994 | 7/2001 |

(56) References Cited

FOREIGN PATENT DOCUMENTS

| WO | 2003093950 A2 | 11/2003 |
|---|---|---|
| WO | 2013055661 A1 | 4/2013 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, Office Action dated May 3, 2018, issued in connection with Chinese Application No. 201480046718.2, 10 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Feb. 6, 2017, issued in connection with U.S. Appl. No. 15/338,931, filed Oct. 31, 2016, 16 pages.
Non-Final Office Action dated Jun. 9, 2015, issued in connection with U.S. Appl. No. 13/925,367, filed Jun. 24, 2013, 21 pages.
Non-Final Office Action dated May 10, 2016, issued in connection with U.S. Appl. No. 14/973,006, filed Dec. 17, 2015, 14 pages.
Non-Final Office Action dated May 10, 2017, issued in connection with U.S. Appl. No. 15/338,931, filed Oct. 31, 2016, 15 pages.
Non-Final Office Action dated Jul. 12, 2019, issued in connection with U.S. Appl. No. 15/882,631, filed Jan. 29, 2018, 12 pages.
Non-Final Office Action dated Oct. 18, 2021, issued in connection with U.S. Appl. No. 16/939,318, filed Jul. 27, 2020, 21 pages.
Non-Final Office Action dated Aug. 8, 2018, issued in connection with U.S. Appl. No. 15/882,631, filed Jan. 29, 2018, 19 pages.
Notice of Allowance dated Nov. 2, 2015, issued in connection with U.S. Appl. No. 13/925,367, filed Jun. 24, 2013, 9 pages.
Notice of Allowance dated Aug. 17, 2016, issued in connection with U.S. Appl. No. 14/973,006, filed Dec. 17, 2015, 13 pages.
Notice of Allowance dated Sep. 18, 2017, issued in connection with U.S. Appl. No. 15/338,931, filed Oct. 31, 2016, 13 pages.
Yamaha DME Designer 3.5 setup manual guide; copyright 2004, 16 pages.
Yamaha DME Designer 3.5 User Manual; Copyright 2004, 507 pages.
European Patent Office, European Extended Search Report dated Jan. 15, 2020, issued in connection with European Application No. 19212963.3, 12 pages.

European Patent Office, Extended European Search Report dated Oct. 28, 2016, issued in connection with European patent application No. 14817244.8, 12 pages.
European Patent Office, Office Action dated Sep. 22, 2017, issued in connection with European Application No. 14817244.8, 6 pages.
European Patent Office, Partial European Search Report dated Jul. 25, 2016, issued in connection with European patent application No. 14817244.8, 7 pages.
European Patent Office, Summons to Attend Oral Proceedings mailed on Sep. 14, 2018, issued in connection with European Application No. 14817244.8, 6 pages.
Final Office Action dated Jan. 17, 2019, issued in connection with U.S. Appl. No. 15/882,631, filed Jan. 29, 2018, 21 pages.
International Bureau, International Preliminary Report on Patentability, dated Jan. 7, 2016, issued in connection with International Application No. PCT/US2014/043790, filed on Jun. 24, 2014, 8 pages.
International Searching Authority, International Search Report dated Oct. 10, 2014, issued in connection with International Application No. PCT/US2014/043790, filed on Jun. 24, 2014, 3 pages.
International Searching Authority, Written Opinion dated Oct. 10, 2014, issued in connection with International Application No. PCT/US2014/043790, filed on Jun. 24, 2014, 6 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Notice of Allowance dated Oct. 23, 2019, issued in connection with U.S. Appl. No. 15/882,631, filed Jan. 29, 2018, 8 pages.
Notice of Allowance dated Mar. 25, 2020, issued in connection with U.S. Appl. No. 15/882,631, filed Jan. 29, 2018, 7 pages.
Notice of Allowance dated Feb. 7, 2022, issued in connection with U.S. Appl. No. 16/939,318, filed Jul. 27, 2020, 8 pages.
Palm, Inc., "Handbook for the Palm VII Handheld," May 2000, 311 pages.
Pre-Appeal Brief Decision dated May 21, 2019, issued in connection with U.S. Appl. No. 15/882,631, filed Jan. 29, 2018, 2 pages.
Presentations at WinHEC 2000, May 2000, 138 pages.
Sonos, "Sonos Play: 5 (Formerly S5) Product Guide," 2004-2011, 14 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.

* cited by examiner

INTELLIGENT AMPLIFIER ACTIVATION

CROSS REFERENCE TO RELATED APPLICATIONS

This application claims priority under 35 U.S.C. § 120 to, and is a continuation of, U.S. non-provisional patent application Ser. No. 16/939,318, filed on Jul. 27, 2020, entitled "Intelligent Amplifier Activation," which is incorporated herein by reference in its entirety.

U.S. non-provisional patent application Ser. No. 16/939,318 claims priority under 35 U.S.C. § 120 to, and is a continuation of, U.S. non-provisional patent application Ser. No. 15/882,631, filed on Jan. 29, 2018, entitled "Intelligent Amplifier Activation," and issued as U.S. Pat. No. 10,728,681 on Jul. 28, 2020, which is incorporated herein by reference in its entirety.

U.S. non-provisional patent application Ser. No. 15/882,631 claims priority under 35 U.S.C. § 120 to, and is a continuation of, U.S. non-provisional patent application Ser. No. 15/338,931, filed on Oct. 31, 2016, entitled "Intelligent Amplifier Activation," and issued as U.S. Pat. No. 9,883,306 on Jan. 30, 2018, which is incorporated herein by reference in its entirety.

U.S. non-provisional patent application Ser. No. 15/338,931 claims priority under 35 U.S.C. § 120 to, and is a continuation of, U.S. non-provisional patent application Ser. No. 14/973,006, filed on Dec. 17, 2015, entitled "Intelligent Amplifier Activation," and issued as U.S. Pat. No. 9,516,441 on Dec. 6, 2016, which is incorporated herein by reference in its entirety.

U.S. non-provisional patent application Ser. No. 14/973,006 claims priority under 35 U.S.C. § 120 to, and is a continuation of, U.S. non-provisional patent application Ser. No. 13/925,367, filed on Jun. 24, 2013, entitled "Intelligent Amplifier Activation," and issued as U.S. Pat. No. 9,285,886 on Mar. 15, 2016, which is also incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
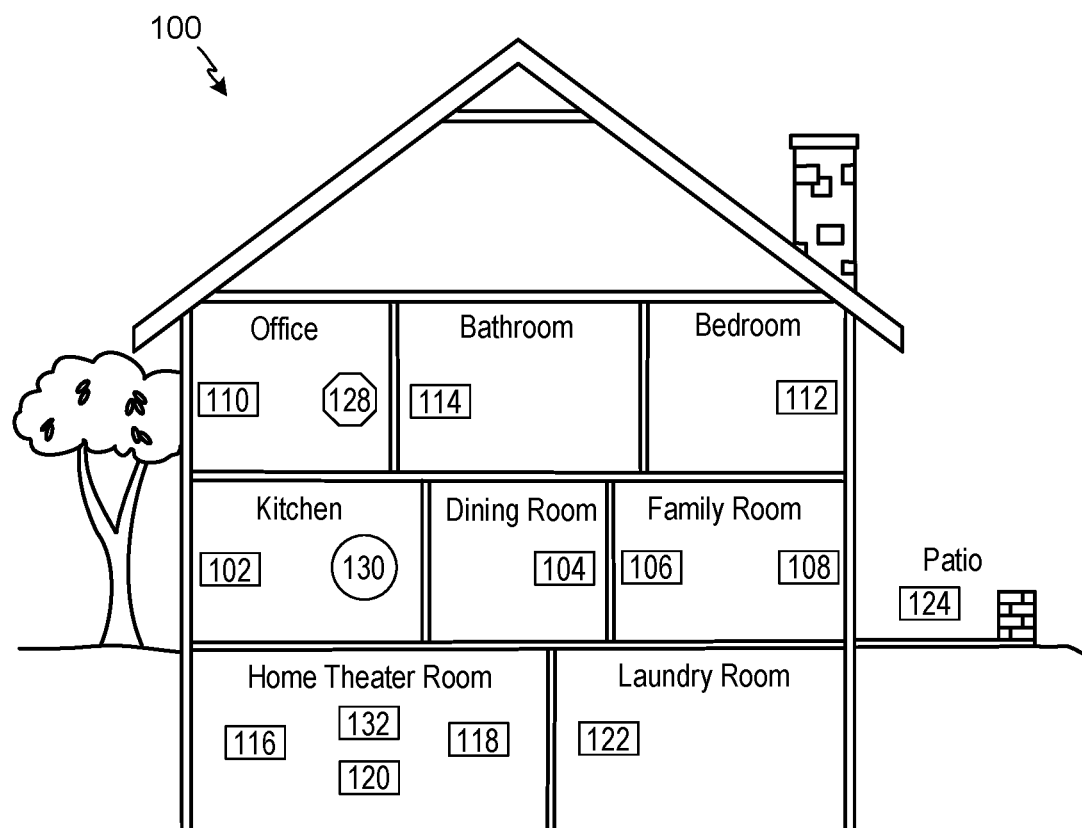
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein involve intelligent activation of an amplifier in a playback device based on proximity detection. In one example, a household of a user may include one or more playback devices configured as a network media system. Each playback device in the one or more playback devices may be configured to render media content in response to a user input. To reduce power consumption, a playback device in the one or more playback devices may be configured to enter a quasi-idle state such that an amplifier of the playback device may be inactive, or powered off or in some other low-power mode while the playback device is not rendering media content. The amplifier may then be activated, or powered on in response to receiving the user input to render media content.

In this case, a delay may occur between when the user input is received and when media content is rendered by the playback device due to time taken by the playback device for the amplifier to be activated and the playback device to enter the active state from the quasi-idle state. In one example, the playback device may be configured to determine in advance of receiving the user input, that a user input is anticipated. For instance, the playback device may include a proximity sensor configured to detect movement relative to the playback device. A determination may then be made as to whether a user input is anticipated based on the detected movement.

In one example, the playback device may include external control buttons that a user may press or otherwise interact with to cause the playback device to render media content. In this case, a determination may be made that a user input is anticipated if the detected movement indicates a movement of the user towards the playback device, or more specifically in some cases, the external control buttons on the playback device.

In one case, the proximity sensor may be a proximity sensor module having one or more different types of sensors, such as a capacitive sensor, an infrared sensor, a photo-sensing device, and a wireless communication strength sensor. The proximity sensor module may detect relative movements at different distances from the playback device using different sensors or combinations of sensors. For instance, the proximity sensor module may use the capacitive sensor, infrared sensor, and/or photo-sensing device to detect movement within a line-of-sight range of the playback device, such as when a user physically approaches the playback device.

In some cases, the user input causing the playback device to render media content may be received from a device wirelessly in communication with the playback device. For instance, a mobile phone carried by a user may be configured and used by the user to access and control the network media system. As such, in one case, the proximity sensor module may use the wireless communication strength sensor to determine that the user carrying the mobile device is approaching the playback device.

In another case, the wireless communication strength sensor may be configured to detect whether a wireless connection is or may be established between the playback device and the wireless device. For instance, the wireless communication strength sensor may be in communication with a communication module of the playback device. The communication module of the playback device may be an interface through which the playback device may communicate with other playback devices in the network media system, as well as any mobile device configured for accessing and controlling the network media system. As such, the wireless communication strength sensor may detect, via the communication module that a mobile device has established communication, or has entered a communicative range with the network media system. In one case, this may occur when the user has returned to the household after being away from the household. In another case, this may occur when the user opens an application on the mobile device for accessing and controlling the network media system, resulting in active wireless communication between the mobile device and the network media system.

In some cases, as will be discussed in further detail below, the network media system in the household may include one or more organized groups of playback devices. For instance, a group of playback devices located in general vicinity, such as a bedroom, may be configured to render media content in synchrony. In this case, if the playback device is in such a group of playback devices, the playback device may be configured to send an activation message to other playback devices in the group if the playback device determines that a user input to cause the playback device to render media content is anticipated. The activation message may indicate that a respective amplifier for each of the playback devices in the group should be activated (if not already active) in anticipation of receiving a user input cause the group to render media content in synchrony. In another example implementation, each playback device of the network media system in the household may be configured to enter the active state when a mobile device establishes communication, or enters a communicative range with the network media system, as mentioned above. Other examples may also be possible.

As indicated above, the present application involves intelligent activation of an amplifier in a playback device based on user proximity detection. In one aspect, a method is provided. The method involves while an amplifier in a playback device is in an inactive state, detecting by a proximity sensor on the playback device, movement in relation to the playback device, and responsive to the detected movement, causing the amplifier to enter an active state.

In another aspect, a device is provided. The device includes a proximity sensor, an amplifier, a processor, and a computer readable medium having stored thereon instructions executable by the processor to cause the device to perform functions. The functions include while the amplifier in the playback device is in an inactive state, detecting by the proximity sensor, movement in relation to the playback device, responsive to the detected movement, causing the amplifier to enter an active state, receiving a user input to cause the playback device to render media content, and responsive to the user input, causing the playback device to render media content.

In yet another aspect, a non-transitory computer readable memory is provided. The non-transitory computer readable memory has stored thereon instructions executable by a computing device to cause the computing device to perform functions. The functions include while an amplifier in a playback device is in an inactive state, detecting by a proximity sensor on the playback device, movement in relation to the playback device, responsive to the detected movement, causing the amplifier to enter an active state, receiving a user input to cause the playback device to render media content, and responsive to the user input, causing the playback device to render media content.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. Zone players 102-124, also referred to herein as playback devices, multimedia units, speakers, players, and so on, provide audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
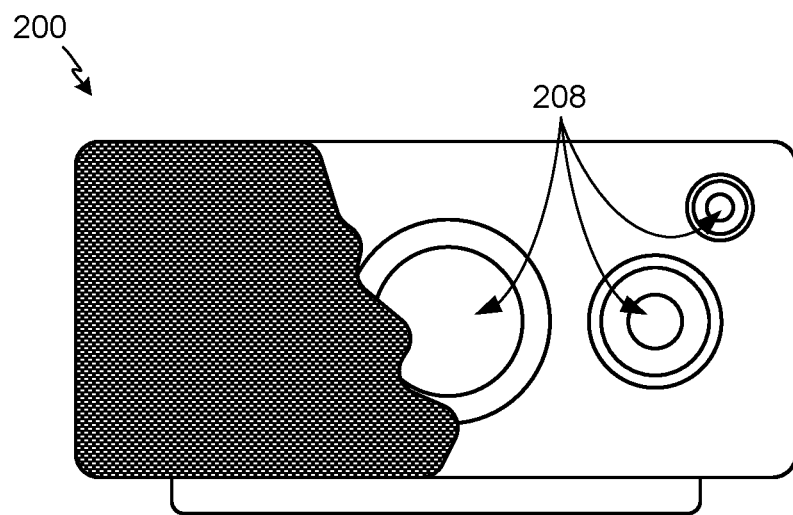
FIG. 2A shows an illustration of an example zone player having a built-in amplifier and transducers.
Figure 2B:
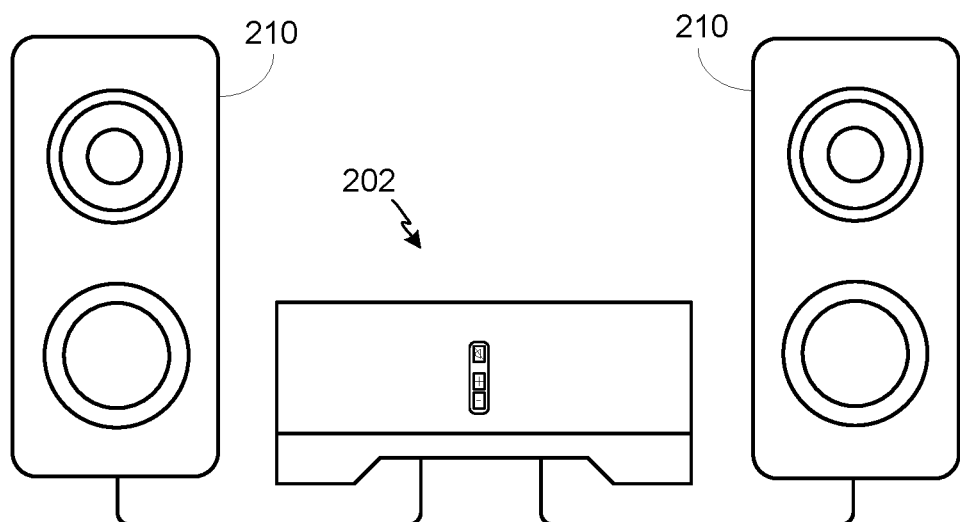
FIG. 2B shows an illustration of an example zone player having a built-in amplifier and connected to external speakers.
Figure 2C:
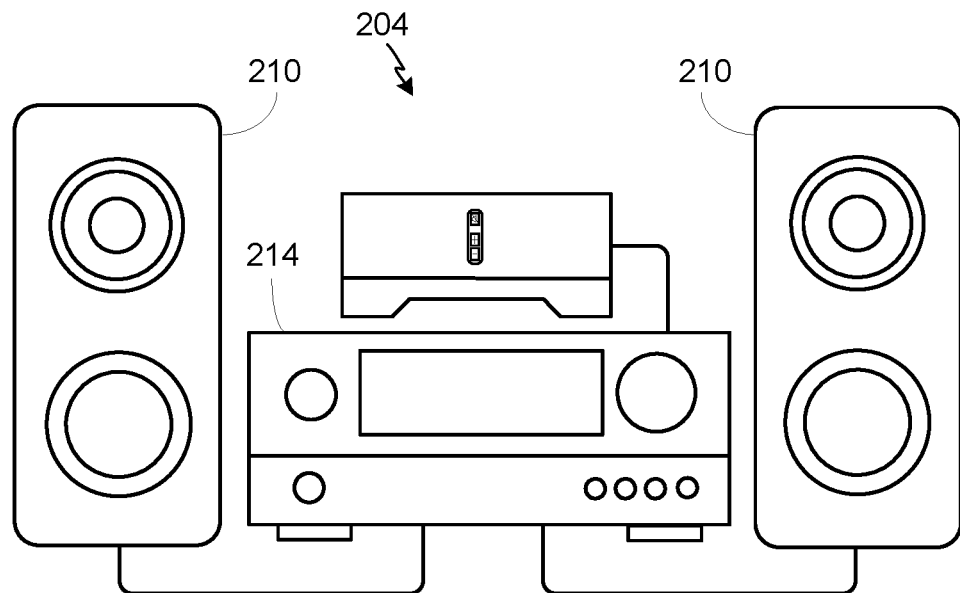
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates a zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the media content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, California presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
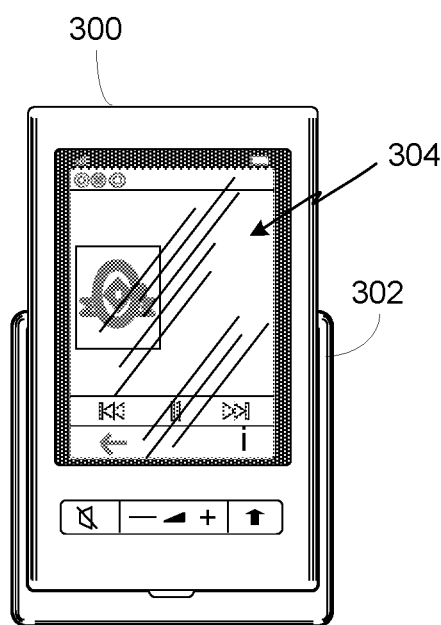
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, California include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Zone players 102-124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
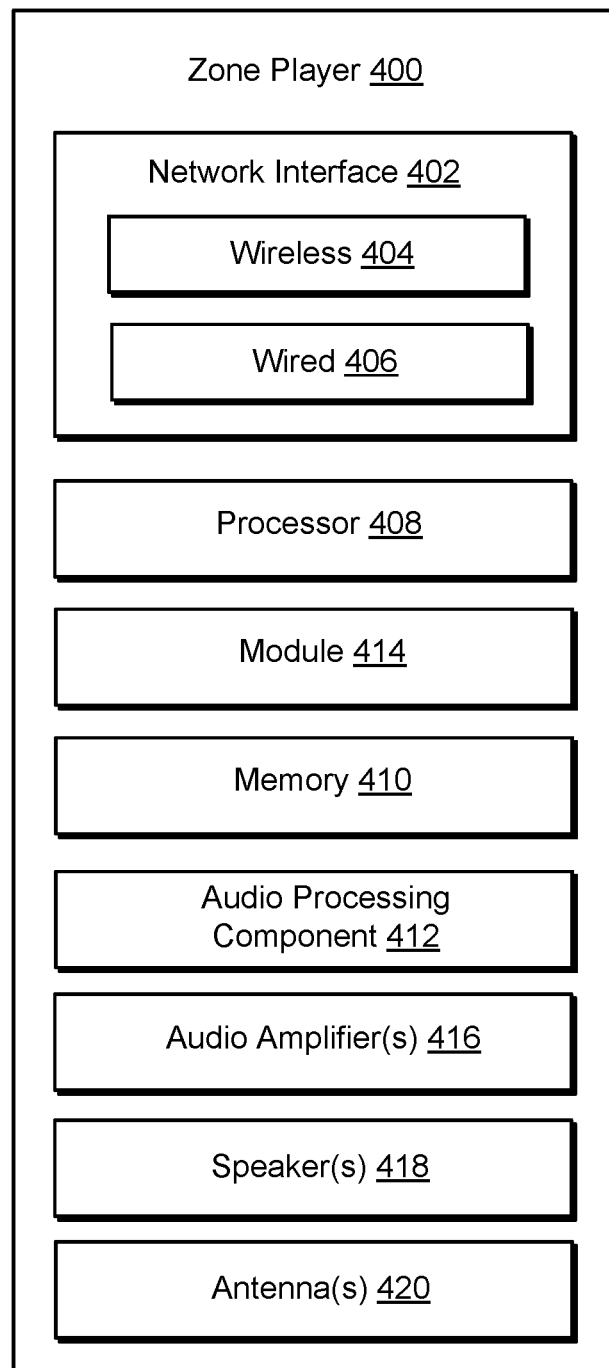
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
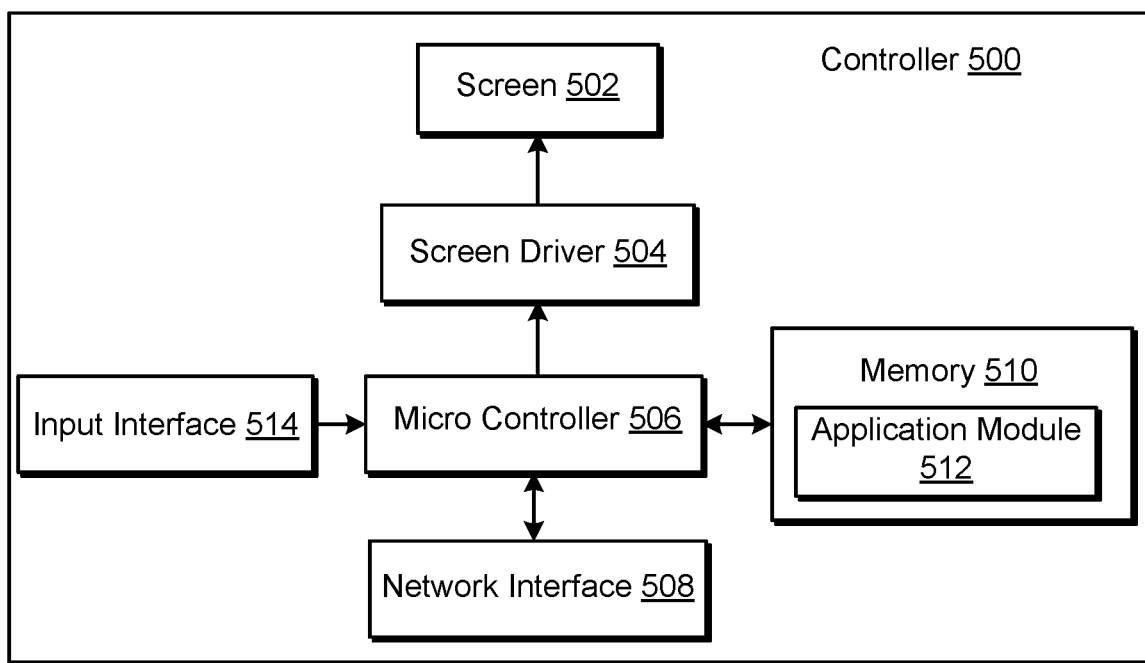
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group to facilitate synchronized playback amongst the zone players in the zone group. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smart phone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+ dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/ rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
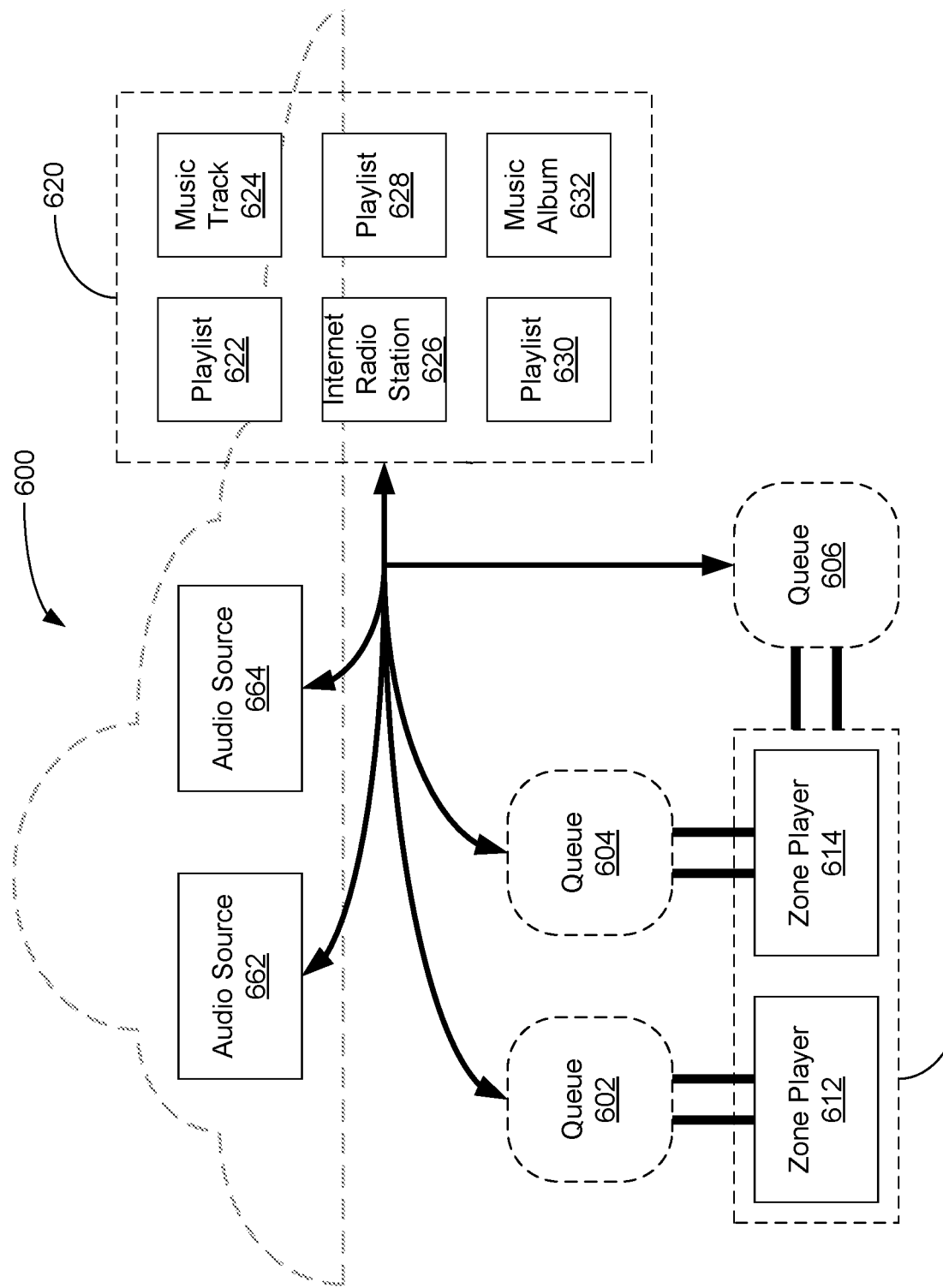
FIG. 6 shows an example playback queue configuration for a network media system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
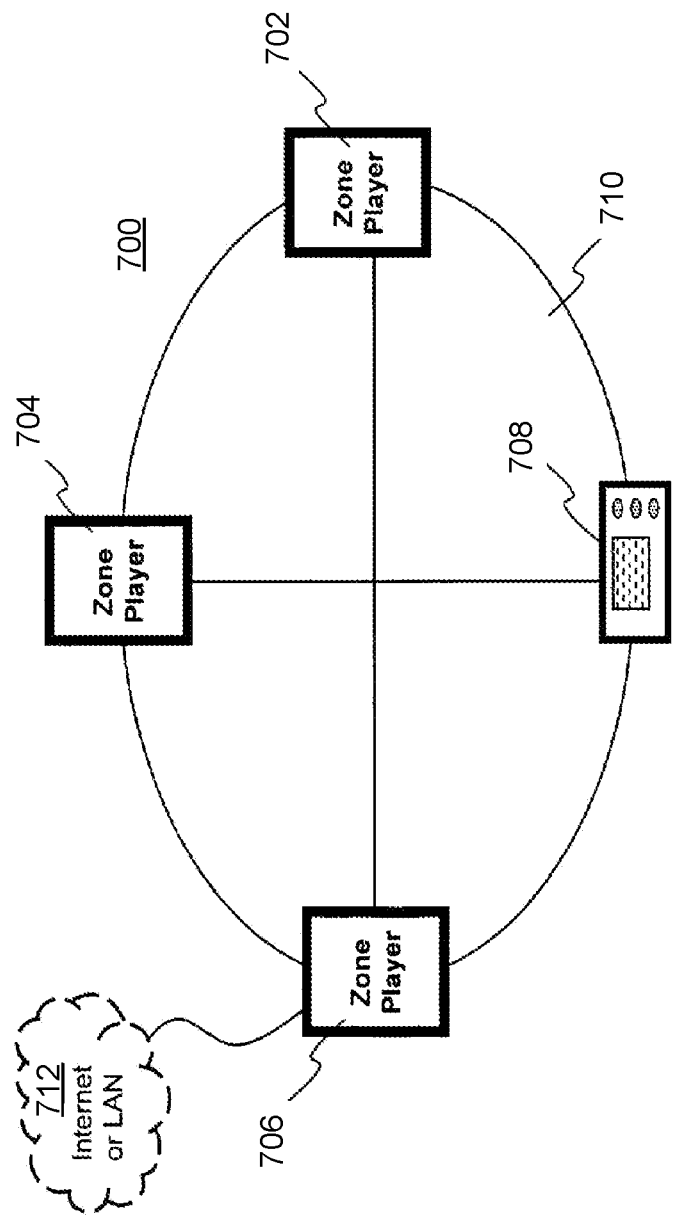
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
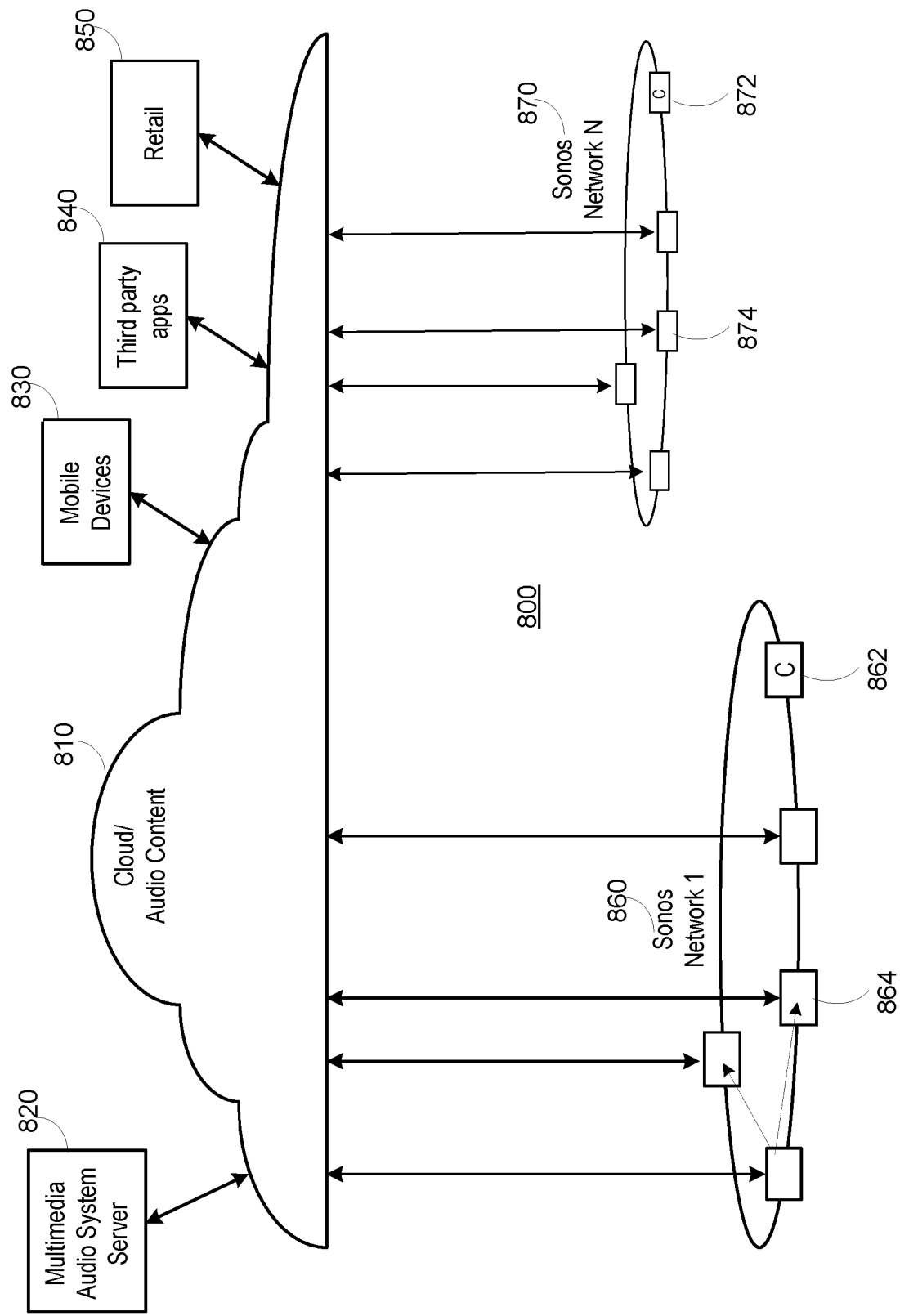
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Intelligent Activation of Playback Device Amplifier

As discussed above, embodiments described herein involve intelligently activating of an amplifier in a playback device based on proximity detection. As indicated, activating the inactive amplifier of a playback device in a quasi-idle state based on proximity detection may reduce the delay that occurs between when a user input is received to cause the playback device to render media content and when the media content is rendered by the playback device due to time taken by the playback device to activate the amplifier and enter an active state in response to the user input.

Figure 9:
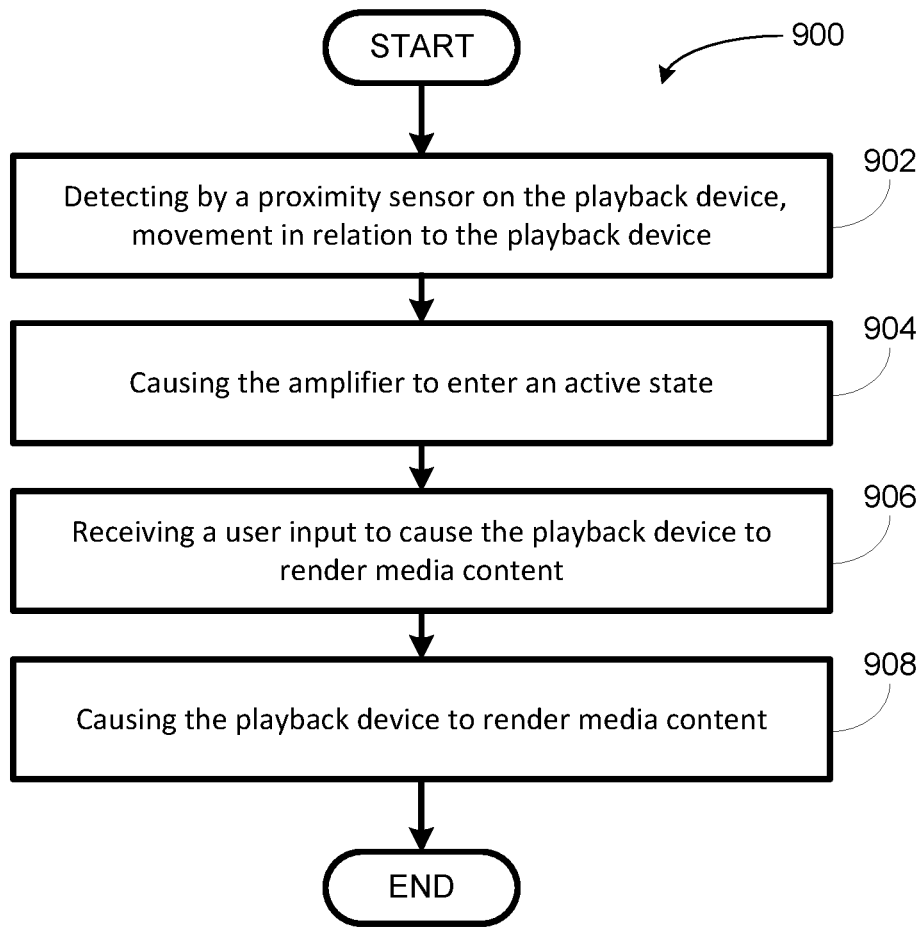
FIG. 9 shows an example flow diagram for intelligently activating an amplifier in a playback device based on user proximity detection.

FIG. 9 shows an example flow diagram for intelligently activating an amplifier in a playback device based on proximity detection, in accordance with at least some embodiments described herein. Method 900 shown in FIG. 9 presents an embodiment of a method that could be used in the environments 100, 600, 700, and 800 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-908. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

At block 902, the method 900 may involve detecting by a proximity sensor on the playback device, movement in relation to the playback device. For illustration purposes, the playback devices discussed hereafter may be a zone player as described above in connection to FIGS. 2A-2C. As such, the playback device may be one of a group of playback devices in a network media system as discussed and shown in FIG. 1.

In one example, the playback device may be configured to have different operational states, such as an active state and a quasi-idle state. The active state may be such that the all components and modules of the playback device necessary for rendering media content are active, whether or not the playback device is actually rendering media content. While the playback device is in an active state, rendering of media content may occur immediately, or substantially immediately in response to a user input to cause to the playback device to render media content.

On the other hand, the quasi-idle state may be such that some components and modules of the playback device are inactive, while other components and modules of the playback device are active. For instance, as described above, an amplifier of the playback device may be inactive, while a communication module or communication interface of the playback device may remain active. In this case, the amplifier of the playback device may need to first be activated before the playback device can render media content in response to a user input to cause the playback device to render media content.

In one example, the proximity sensor may be one of the components and modules that remain active while the playback device is in the quasi-idle state, such that detecting movement in relation to the playback device by the proximity sensor may occur while the amplifier is in an inactive state. Accordingly, as suggested above, the amplifier may be pre-emptively activated if the detected movement indicates an anticipated user input to cause the playback device to render media content.

In one case, the proximity sensor may be deactivated once the playback device is activated. This may result in reduced power consumption while the playback device is in the active state. In another case, the proximity sensor may remain active while the playback device is in the active state and utilized for other purposes, such as pre-caching of media content, for example, as discussed further below.

The proximity sensor may be a proximity sensor module including one or more of a capacitive sensor, an infrared sensor, a wireless communication strength sensor, and a photo-sensing device. The proximity sensor module may detect relative movements at different distances from the playback device using different sensors or combinations of sensors. For instance, the proximity sensor module may use the capacitive sensor, infrared sensor, and/or photo-sensing device to detect movement within a line-of-sight range of the playback device, such as when a user physically approaches the playback device. Further, in another example, the capacitive sensor may be used to detect movement relatively near the playback device, while the infrared sensor and/or photo-sensing device may be used to detect movement further from the playback device. In one embodiment, an approach of the user towards the playback device may be determined based on movement detected by the infrared sensor followed by movement detected by the capacitive sensor.

In one case, the proximity sensor may be implemented to avoid false detection, such as movement by a pet of the user near the playback device, or other random motion artifacts. For example, the proximity sensor may be configured to rely on a certain degree of hysteresis, and only detect relative movements lasting longer than a predetermined duration. In one instance, the proximity sensor may be configured to only detect relative movements lasting longer than an example predetermined duration of 0.5 seconds.

As discussed above, the user input to cause the playback device to render media content may be received from a mobile device in communication with the playback device. In one case, the proximity sensor module may use the wireless communication strength sensor to determine that the user carrying the mobile device is approaching the playback device. In another case, the wireless communication strength sensor may be in communication with a communication module of the playback device such that the wireless communication strength sensor may detect, via the communication module that a mobile device has established communication, or has entered a communicative range with the network media system. In a further case, the communication module may be configured to monitor data signal traffic within a local network of the household. In this case, the wireless communication strength sensor may determine via the communication module whether a user is present within the household.

Figure 10A:
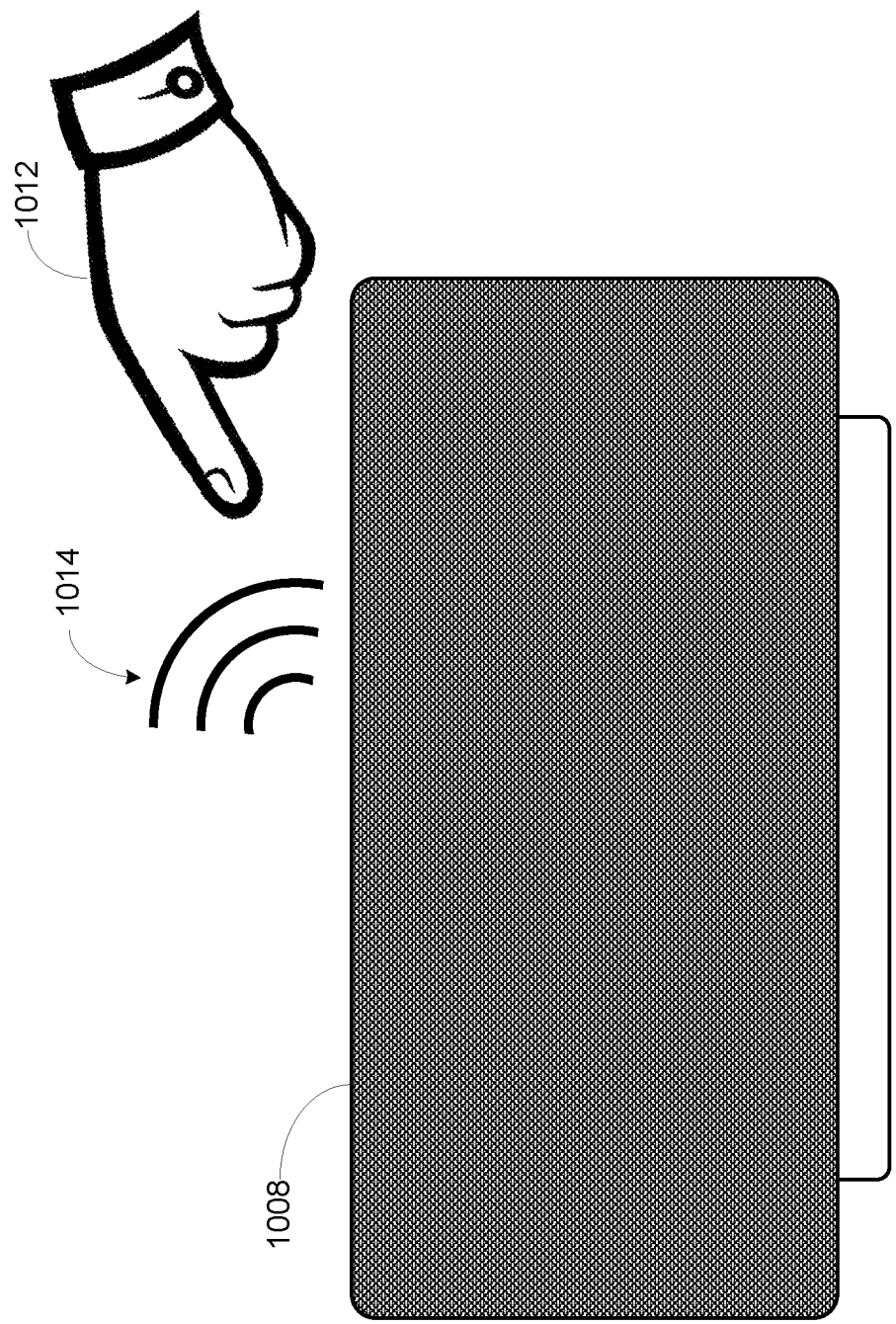
FIG. 10A shows an example playback device with proximity sensing capabilities for intelligently activating an amplifier in the playback device based on user proximity detection.

FIG. 10A shows an example playback device 1008 with proximity sensing capabilities 1014 for intelligently activating an amplifier in the playback device based on user proximity detection. As shown, the proximity sensing capabilities 1014 of the playback device 1008 may detect an approach of a user 1012. In one case, the proximity sensing capabilities 1014 may detect a general proximity of the user 1012 to the playback device. In another case, the proximity sensing capabilities 1014 may detect a more specific approach of the user 1012 towards one or more external control buttons on the playback device 1008. For instance, if the external control buttons are on a top side of the playback device 1008, the proximity sensing capabilities 1014 may detect a hand of the user 1012 reaching towards the top of the playback device 1008.

At block 904, the method 900 may involve causing the amplifier to enter an active state. As indicated above, the amplifier may be activated in response to the detected movement. In one case, the playback device may cause the amplifier to enter the active state in response to any detected movement. For example, the amplifier may enter the active state in response to detecting any movement within a vicinity of where the playback device is located, or any movement occurring within a movement detection range of the playback device. In another example, causing the amplifier to enter the active state in response to the detected movement may further involve determining that the detected movement indicates a user-approach toward the playback device. In other words, the playback device may cause the amplifier to enter the active state only if a determination is made that the detected movement indicates an anticipated user input.

As described above, the proximity sensor may detect movement at different ranges of distances from the playback device using different types of sensors or configurations of the sensors. As such, if the proximity sensor detects a series of movements by the user that at subsequently closer distances to the playback device, the playback device may determine that the user is approaching the playback device (rather than simply walking by), and may determine that a user input is anticipated. The playback device may then accordingly cause the amplifier to enter the active state. In another example, as shown in FIG. 10A, if the proximity sensor detects movement indicating the user reaching toward where external control buttons of the playback device are located, the playback device may determine that a user input is anticipated and accordingly cause the amplifier to enter the active state.

Figure 10B:
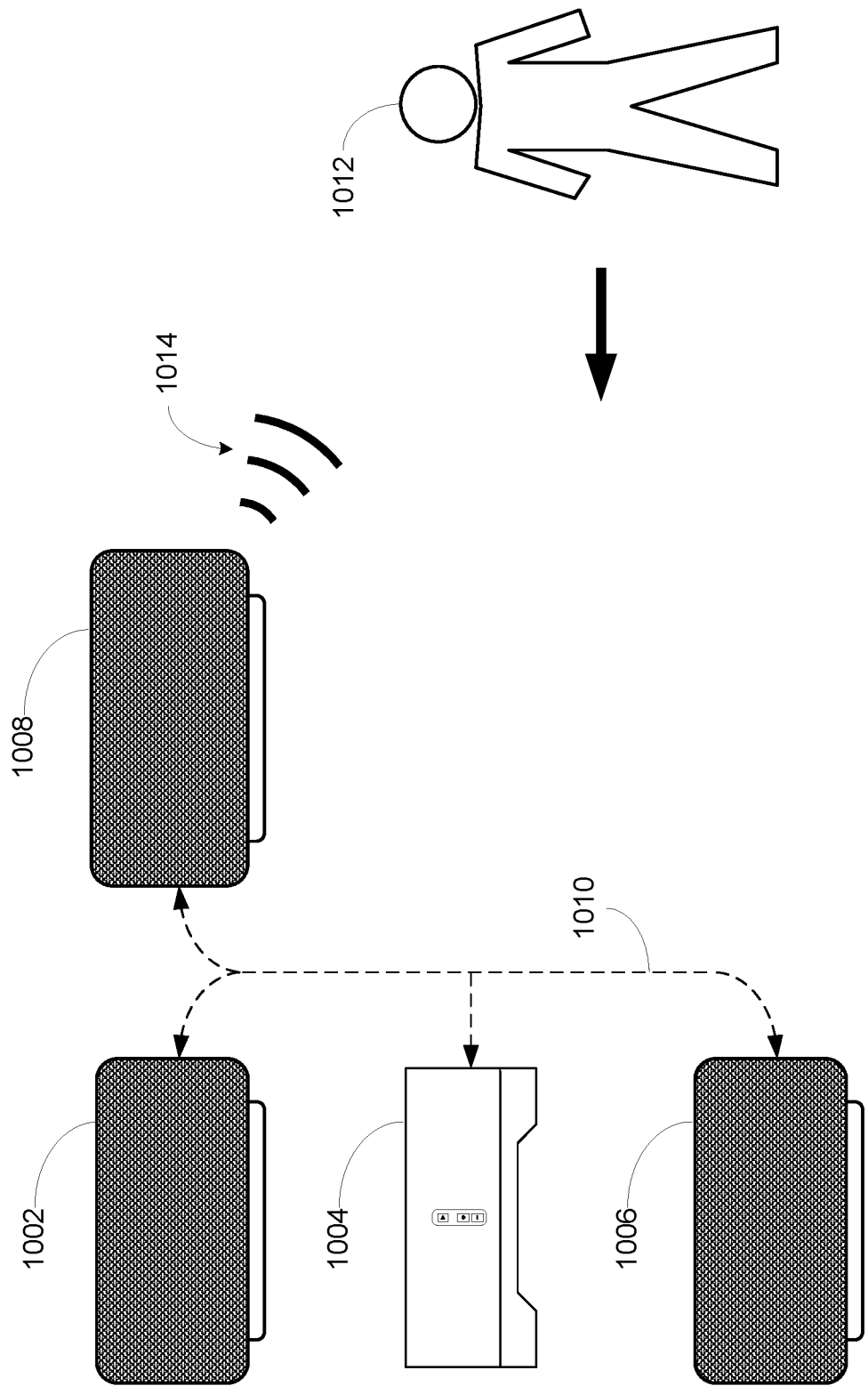
FIG. 10B shows an example group of playback devices with proximity sensing capabilities for intelligently activating respective amplifiers in the playback devices based on proximity detection.

In some embodiments, the playback device may be one of multiple playback devices forming a network media system in a household, as suggested above. For instance, the playback device may be one of the zone players shown in FIG. 1. FIG. 10B shows an example group of playback devices 1002, 1004, 1006, and 1008, one or more of which have proximity sensing capabilities for intelligently activating respective amplifiers in the playback devices based on proximity detection. FIG. 10B also shows the proximity sensing capabilities 1014 of the playback device 1008, and the user 1012 moving towards the group of playback device 1002-1008. In one example, the playback devices 1002-1008 may each be part of a network media system in a household. In one case, the playback devices 1002-1008 may be part of one or more zone groups within the household. For instance, playback devices 1008 and 1002 may be a stereo pair in a first zone group, while playback devices 1004 and 1006 may be in a second zone and a third zone, respectively. Other examples are also possible.

Whichever the configuration, each of the playback devices 1002-1008 shown in FIG. 10A may render media content individually or in synchrony with one or more of the other ones of the playback devices 1002-1008. In the case the playback devices 1002-1008 are configured as a group to render media content in synchrony, the operational states of the playback devices 1002-1008 may be synchronized. For instance, if the group is not rendering any media content and is not likely to be rendering media content, then the playback devices 1002-1008 may be in the quasi-idle state such that amplifiers for each of the playback devices 1002-1008 are in inactive states. In such a case, if one playback device, such as the playback device 1008 in this example, detects movement indicating that a user input is anticipated, the playback device may be configured to send an activation message to the other playback devices to cause respective amplifiers in the other playback devices to also enter the active state.

In some cases, the operational states of each of the playback devices in a zone may not all be synchronized. In other words, one or more of the playback devices 1002-1008 may be in the active state while the others may be in the quasi-idle state. In this case, the playback device 1008, upon detecting movement indicating an anticipated user input, may further determine which of the other playback devices in the group are in the inactive state, and sending activation messages to only the playback devices in the inactive state.

As suggested above, the playback devices 1002-1008 may represent all playback devices in a household. In this case, if the playback device discussed in connection to the method 900 is one of such a group of playback devices, the playback device may be configured to send a message to other playback devices in the group if the playback device determines that a user input to cause the playback device to render media content is anticipated such that each of the playback devices in the group may enter the active state in anticipation of receiving a user input to render media content in synchrony. In an analogous implementation, each playback device of the network media system in the household may be configured to enter the active state when a mobile device establishes communication, or enters a communicative range with the network media system, as mentioned above. Other examples may also be possible.

In addition to pre-emptively activating playback devices in anticipation of user inputs to cause the playback devices to render media content, the movement detected by the proximity sensor on the playback device may also be utilized in other ways to provide a more seamless transition by a playback device from not rendering media content to begin rendering media content.

For instance, delays due to time taken for media content to be retrieved and buffered between when the user input is received and when media content is rendered by the playback device may be addressed by pre-caching media content when movement detected by the proximity sensor on the playback device indicates that a user input is anticipated. In this case, media content to be pre-cached may be determined as one of media content last rendered, or media content most frequently rendered, for example. As such, the method 900 may further involve retrieving media content from a networked audio source in response to the detected movement, and storing (or caching) the retrieved media content on a data storage medium of the playback device in anticipation of the user input to render media content.

In one example, the pre-caching of media content by a playback device may occur at substantially the same time an amplifier of the playback device is being activated. This may the case when the activation of the amplifier and pre-caching of media content are both responsive to the same detected movement indicating an anticipated user input.

In another case, the pre-caching of media content and activation of the amplifier may be responsive to different movement detections. For instance, as indicated above, the proximity sensor may be configured to detect movement at different ranges of distances. As such, activation of the amplifier may be responsive to movement detected within a first range of distances from the playback device, and pre-caching of media content may be responsive to movement detected within a second range of distances.

In one example, the first range of distances may be farther from the playback device than the second range of distances. This may be the case if activation of the amplifier takes more time than pre-caching of media content by the playback device. In another example, the first range of distances may be nearer to the playback device than the second range of distances. This may be the case if activation of the amplifier takes less time than pre-caching of the media content by the playback device.

In one example embodiment, one or more playback devices in a network media system, such as the playback devices 1002-1008 of FIG. 10B may be configured to enter the active state from the quasi-idle state when a mobile device through which a user may access and control the network media system establishes communication with the network media system. In this embodiment, the one or more playback devices may be configured to then pre-cache media content when movement by a user is detected within a vicinity of one of the one or more playback devices.

In another example embodiment, the one or more playback devices may be configured to enter the active state from the quasi-idle state when movement by a user is detecting within a vicinity of one of the one or more playback devices. This may be when the user enters a room where the one or more playback devices are located. In this embodiment, the one or more playback devices may be configured to then pre-cache media content when movement is detected indicating that a user is approaching and/or reaching toward the external control buttons of one of the one or more playback devices. Other examples are also possible.

At block 906, the method 900 may involve receiving a user input to cause the playback device to render media content. As suggested above, the user input may be received via a mobile device configured to access and control the network media system including the playback device, or via external control buttons on the playback device.

At block 908, the method 900 may involve causing the playback device to render media content. In one example, causing the playback device to render media content may be in response to the received user input. In one case, if the user input is received via a mobile device, the user input may further indicate a user-selected media content to be rendered by the playback device. In one instance, if the playback device is one of a group of playback devices configured to render media content in synchrony as indicated above, the media content may be a group media content to be rendered by each of the playback devices in the group. In the case the playback device is one of a stereo pair of playback devices, the media content rendered by the playback device may be the respective channel of the media content to be rendered.

In another case, if the user input is received via external control buttons on the playback device, the media content being rendered may be, for example, previously rendering media content that was paused, the last media content rendered by the playback device, or media content most frequently played by the playback device. In an instance where media content was pre-cached as described above, the media content being rendered may be the media content that was pre-cached.

As discussed above, the quasi-idle state of the playback device may be implemented to reduce power consumption while the playback device is not rendering media content and unlikely to receive an input to render media content. Consequently, activating the amplifier in the playback device pre-emptively based on detected movement indicating an anticipated user input may be a means to reduce or substantially eliminate the delay that may occur between when the user input is received and when media content is rendered by the playback device due to time taken by the playback device for the amplifier to be activated and the playback device to enter the active state from the quasi-idle state.

In addition to detected movements indicating an anticipated user input, the amplifier of the playback device may also be pre-emptively activated based on an amplifier activation schedule. In one example, a time stamp may be recorded for each time a user input is received to cause the playback device to render media, creating a database of user input time stamps. The database of user input time stamps may include user input time stamps for each playback device in the network media content of the household. Based on the data in the database, an amplifier activation schedule may be generated for each individual playback device, groups of playback devices, and the entire household of playback devices. For instance, if a group of playback devices frequently receives user input to render media content at around 7:30 pm on Sundays, the amplifier activation schedule may indicate that playback devices in the group are to enter an active state (if not already in an active state) at 7:30 pm each Sunday. As such, each of the playback devices will be in the active state by 7:30 pm each Sunday and ready to render media content upon receiving a user input to do so. In one case, the amplifier activation schedule may be continuously updated as new user input time stamps are recorded in the database.

In some embodiments, pre-emptive activation of amplifiers may be based on a combination of the amplifier activation schedule and detected movement indicating an anticipated user input. In some other embodiments, the pre-emptive activation of amplifiers may be based only one or the other of the amplifier activation schedule and detected movement indicating an anticipated user input.

Further, in addition to activating an amplifier based on detected movements in order reduce or substantially eliminate the delay that may occur between when the user input is received and when media content is rendered by the playback device, the proximity detection abilities of the playback device may also be utilized in other manners to enhance multimedia experiences of the user. For instance, proximity detection may be further based on to mute or turn off (de-activate) a playback device if the user is no longer within a vicinity of the playback device, or adjust a playback volume of the playback device such that the perceived playback volume by the user remains substantially the same as the user moves around the household. Other examples are also possible.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves intelligent activation of an amplifier in a playback device based on user proximity detection. In one aspect, a method is provided. The method involves while an amplifier in a playback device is in an inactive state, detecting by a proximity sensor on the playback device, movement in relation to the playback device, and responsive to the detected movement, causing the amplifier to enter an active state.

In another aspect, a device is provided. The device includes a proximity sensor, an amplifier, a processor, and a computer readable medium having stored thereon instructions executable by the processor to cause the device to perform functions. The functions include while the amplifier in the playback device is in an inactive state, detecting by the proximity sensor, movement in relation to the playback device, responsive to the detected movement, causing the amplifier to enter an active state, receiving a user input to cause the playback device to render media content, and responsive to the user input, causing the playback device to render media content.

In yet another aspect, a non-transitory computer readable memory is provided. The non-transitory computer readable memory has stored thereon instructions executable by a computing device to cause the computing device to perform functions. The functions include while an amplifier in a playback device is in an inactive state, detecting by a proximity sensor on the playback device, movement in relation to the playback device, responsive to the detected movement, causing the amplifier to enter an active state, receiving a user input to cause the playback device to render media content, and responsive to the user input, causing the playback device to render media content.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A playback device comprising:
an audio transducer;
at least one sensor;
at least one physical hardware component;
a housing carrying the audio transducer and the at least one physical hardware component; and
data storage including instructions that are executable by at least one processor such that the playback device is configured to:
enter an inactive state in which the playback device is not actively playing audio via the audio transducer, wherein the at least one physical hardware component is in a first power mode while the playback device is in the inactive state, and wherein the at least one physical hardware component is configured to consume less power in the first power mode relative to a second power mode;

while the playback device is in the inactive state, detect, via the at least one sensor, an indication that a user has entered proximity of the playback device, wherein the at least one sensor is configured to detect that the user has entered the proximity of the playback device before the user touches the housing of the playback device;

in response to detection of the indication that the user has entered proximity of the playback device, enter an active state, wherein the at least one physical hardware component is the second power mode while the playback device is in the active state;

while the playback device is in the active state, receive an instruction to cause the playback device to render particular audio content, wherein the particular audio content is stored at a network location remote from the playback device; and responsive to receipt of the instruction: (i) stream, via a network interface, data representing the particular audio content from the network location remote from the playback device, (ii) process the data representing the particular audio content into one or more analog signals representing the particular audio content and (iii) play back the particular audio content via an amplifier that amplifies the one or more analog signals for output via the audio transducer.

2. The playback device of claim 1, wherein the at least one physical hardware component is disabled in the first power mode, and wherein the instructions that are executable by the at least one processor such that the playback device is configured to enter the active state comprise instructions that are executable by the at least one processor such that the playback device is configured to:

enable the at least one physical hardware component in the second power mode.

3. The playback device of claim 1, wherein the at least one physical hardware component comprises the amplifier, and wherein the instructions that are executable by the at least one processor such that the playback device is configured to enter the active state comprise instructions that are executable by the at least one processor such that the playback device is configured to:

switch the amplifier from the first power mode to the second power mode.

4. The playback device of claim 1, wherein the at least one physical hardware component comprises the at least one processor, and wherein the instructions that are executable by the at least one processor such that the playback device is configured to enter the active state comprise instructions that are executable by the at least one processor such that the playback device is configured to:

switch the at least one processor from the first power mode to the second power mode.

5. The playback device of claim 4, wherein the at least one processor comprises an audio processor, and wherein the instructions that are executable by the at least one processor such that the playback device is configured to switch the at least one processor from the first power mode to the second power mode comprise instructions that are executable by the at least one processor such that the playback device is configured to:

switch the audio processor from the first power mode to the second power mode.

6. The playback device of claim 1, wherein the at least one physical hardware component comprises the network interface, and wherein the instructions that are executable by the at least one processor such that the playback device is configured to enter the active state comprise instructions that are executable by the at least one processor such that the playback device is configured to:

switch the network interface from the first power mode to the second power mode.

7. The playback device of claim 6, wherein the network interface comprises a wireless network interface, and wherein the instructions that are executable by the at least one processor such that the playback device is configured to switch the network interface from the first power mode to the second power mode comprise instructions that are executable by the at least one processor such that the playback device is configured to:

switch the wireless network interface from the first power mode to the second power mode.

8. The playback device of claim 1, wherein the playback device is configured in a synchrony group with an additional playback device, wherein the additional playback device comprises at least one additional physical hardware component, and wherein the instructions are executable by the at least one processor such that the playback device is further configured to:

in response to detection of the indication that the user has entered proximity of the playback device, cause, via the network interface, the additional playback device to enter the active state, wherein the at least one additional physical hardware component is the second power mode while the additional playback device is in the active state.

9. The playback device of claim 1, wherein the at least one sensor comprises a proximity sensor, and wherein the instructions that are executable by the at least one processor such that the playback device is configured to detect the indication that the user has entered proximity of the playback device comprise instructions that are executable by the at least one processor such that the playback device is configured to:

detect, via the proximity sensor, movement of the user in proximity to the playback device.

10. The playback device of claim 1, wherein the instructions are executable by the at least one processor such that the playback device is further configured to:

in response to detection of the indication that the user has entered proximity of the playback device, send, via the network interface to a control device, data indicating that the playback device is in the active state.

11. A system comprising a playback device, the playback device comprising:

an audio transducer;

at least one sensor;

at least one physical hardware component;

a housing carrying the audio transducer and the at least one physical hardware component, and the system comprising:

at least one processor; and data storage including instructions that are executable by at least one processor such that the system is configured to:

cause the playback device to enter an inactive state in which the playback device is not actively playing audio via the audio transducer, wherein the at least one physical hardware component is a first power mode while the playback device is in the inactive state, and wherein the at least one physical hardware component is configured to consume less power in the first power mode relative to a second power mode;

while the playback device is in the inactive state, detect, via the at least one sensor, an indication that a user has entered proximity of the playback device, wherein the at least one sensor is configured to detect that the user has entered the proximity of the playback device before the user touches the housing of the playback device;

in response to detection of the indication that the user has entered proximity of the playback device, cause the playback device to enter an active state, wherein the at least one physical hardware component is the second power mode while the playback device is in the active state;

while the playback device is in the active state, receive an instruction to cause the playback device to render particular audio content, wherein the particular audio content is stored at a network location remote from the playback device; and responsive to receipt of the instruction, cause the playback device to: (i) stream, via a network interface, data representing the particular audio content from the network location remote from the playback device, (ii) process the data representing the particular audio content into one or more analog signals representing the particular audio content and (iii) play back the particular audio content via an amplifier that amplifies the one or more analog signals for output via the audio transducer.

12. The system of claim 11, wherein the at least one physical hardware component is disabled in the first power mode, and wherein the instructions that are executable by the at least one processor such that the system is configured to enter the active state comprise instructions that are executable by the at least one processor such that the system is configured to:
cause the playback device to enable the at least one physical hardware component in the second power mode.

13. The system of claim 11, wherein the at least one physical hardware component comprises the amplifier, and wherein the instructions that are executable by the at least one processor such that the system is configured to enter the active state comprise instructions that are executable by the at least one processor such that the system is configured to:
cause the playback device to switch the amplifier from the first power mode to the second power mode.

14. The system of claim 11, wherein the at least one physical hardware component comprises the at least one processor, and wherein the instructions that are executable by the at least one processor such that the system is configured to enter the active state comprise instructions that are executable by the at least one processor such that the system is configured to:
cause the playback device to switch the at least one processor from the first power mode to the second power mode.

15. The system of claim 14, wherein the at least one processor comprises an audio processor, and wherein the instructions that are executable by the at least one processor such that the system is configured to switch the at least one processor from the first power mode to the second power mode comprise instructions that are executable by the at least one processor such that the system is configured to:
cause the playback device to switch the audio processor from the first power mode to the second power mode.

16. The system of claim 11, wherein the at least one physical hardware component comprises the network interface, and wherein the instructions that are executable by the at least one processor such that the system is configured to enter the active state comprise instructions that are executable by the at least one processor such that the system is configured to:
cause the playback device to switch the network interface from the first power mode to the second power mode.

17. The playback device of claim 16, wherein the network interface comprises a wireless network interface, and wherein the instructions that are executable by the at least one processor such that the system is configured to switch the network interface from the first power mode to the second power mode comprise instructions that are executable by the at least one processor such that the system is configured to:
cause the playback device to switch the wireless network interface from the first power mode to the second power mode.

18. The system of claim 11, wherein the playback device is configured in a synchrony group with an additional playback device, wherein the additional playback device comprises at least one additional physical hardware component, and wherein the instructions are executable by the at least one processor such that the system is further configured to:
in response to detecting the indication that the user has entered proximity of the playback device, cause, via the network interface, the additional playback device to enter the active state, wherein the at least one additional physical hardware component is the second power mode while the additional playback device is in the active state.

19. The system of claim 11, wherein the at least one sensor comprises a proximity sensor, and wherein the instructions that are executable by the at least one processor such that the system is configured to detect the indication that the user has entered proximity of the playback device comprise instructions that are executable by the at least one processor such that the system is configured to:
detect, via the proximity sensor, movement of the user in proximity to the playback device.

20. A tangible, non-transitory, computer-readable media having stored thereon instructions that, when executed by one or more processors, cause a playback device to:
enter an inactive state in which the playback device is not actively playing audio via an audio transducer, wherein at least one physical hardware component of the playback device is a first power mode while the playback device is in the inactive state, and wherein the at least one physical hardware component is configured to consume less power in the first power mode relative to a second power mode;

while the playback device is in the inactive state, detect, at least one sensor, an indication that a user has entered proximity of the playback device, wherein the at least one sensor is configured to detect that the user has entered the proximity of the playback device before the user touches a housing of the playback device;

in response to detection of the indication that the user has entered proximity of the playback device, enter an active state, wherein the at least one physical hardware component is the second power mode while the playback device is in the active state;

while the playback device is in the active state, receive an instruction to cause the playback device to render particular audio content, wherein the particular audio content is stored at a network location remote from the playback device; and responsive to receipt of the instruction: (i) stream, via a network interface, data representing the particular audio content from the network location remote from first playback device, (ii) process the data representing the particular audio content into one or more analog signals representing the particular audio content and (iii) play back the particular audio content via an amplifier that amplifies the one or more analog signals for output via the audio transducer.

\* \* \* \* \*